United States Patent [19]

Edson et al.

[11] 4,273,986

[45] Jun. 16, 1981

[54] METHOD AND APPARATUS FOR ARC BUTT WELDING

[75] Inventors: Donald Edson, Newton; Albert W. Carter, Stapleford, both of England

[73] Assignee: Blacks Equipment Limited, Bromley, England

[21] Appl. No.: 94,754

[22] Filed: Nov. 15, 1979

[30] Foreign Application Priority Data

Nov. 15, 1978 [GB] United Kingdom ............... 44654/78

[51] Int. Cl.³ .............................................. B23K 9/08
[52] U.S. Cl. ...................................... 219/123; 219/97; 219/100
[58] Field of Search .......................... 219/97, 100, 123

[56] References Cited

U.S. PATENT DOCUMENTS 3,937,916  2/1976  Sciaky .................................. 219/123

Primary Examiner—E. A. Goldberg
Attorney, Agent, or Firm—Kemon & Estabrook

[57] ABSTRACT

In arc butt welding the arc is moved between the faces of the parts to be joined by a magnetic field. In order to insure the arc travels over the whole of the faces to be welded the parts are moved generally parallel to the faces so that the overlapping area of the faces changes during the arc heating.

14 Claims, 7 Drawing Figures

METHOD AND APPARATUS FOR ARC BUTT WELDING

BACKGROUND OF THE INVENTION

This invention relates to the joining of components by butt welding. It is known to generate the required heat for butt welding by the passage of electric current between the parts to be welded. One process employing such electric heating is resistance butt welding and another is flash butt welding, which employs a combination of arc and resistance heating. The arcs are formed when the initial points of contact between two components to be welded become molten and the molten bridge then ruptures.

Another form of butt welding, known as arc butt welding, is described in British Specification No. 1,089,178. In this specification, it was proposed, for the joining of the end faces of two tubes, to create a magnetic field such that an arc struck between the surfaces to be welded would travel round in a ring between the annular end faces. However, we have found that there is a limitation on the wall thickness of tube that can be satisfactorily welded with this technique; the maximum thickness appears to be in the range of 4 to 5 millimeters and the limitation results from the finite width of the arc.

To overcome this problem, it was proposed in British Patent Specification No. 1,475,450 that for welding tubular workpieces a central conductor should be placed within the workpieces during welding with a rotating arc, the central conductor carrying a current which, according to its direction of flow, causes the rotating arc to move outward from the axis of the tubes or inward towards this axis. This movement results from the interaction between the magnetic field generated by the current passing through the central conductor and the magnetic field around the rotating arc.

However, it is not always possible to use a central conductor within the tubes during their welding and we have devised a method of rendering more uniform the heat distribution over the faces of tubes during arc butt welding which does not involve a central conductor; moreover, this method is also applicable to the arc butt welding of non-tubular components.

SUMMARY OF THE INVENTION

A method according to the present invention, for joining two parts by an arc butt welding process, comprises striking an arc between the two faces to be joined, moving the arc over the faces by means of a magnetic field, relatively moving the two faces in a plane generally parallel to the faces such that the overlapping area of the two faces changes during the arc-heating period, so that the magnetic field and the relative movement constrain the arc roots to move over substantially the whole of each face, and then bringing the faces into registration and applying forging pressure across the said faces.

For the arc butt welding of circular tubes, the arc is caused to rotate in a ring by its interaction with a magnetic field, and the two annular faces to be joined are given a relative orbital movement.

We have found that this relative movement enables a much more uniform distribution of heat across the surfaces to be joined. It permits the successful arc butt welding of thick-walled tubes, for which, in the absence of orbital movement, the heating would be confined either to the bore of the tube or to the outside edge of the tube, resulting in a weld of poor quality on forging.

In order that the invention may be better understood, examples of methods and apparatus for carrying the invention into effect will now be described with reference to the accompanying drawings, in which:

DETAILED DESCRIPTION OF THE PREFERRED EMBODIMENT

Figure 1A:
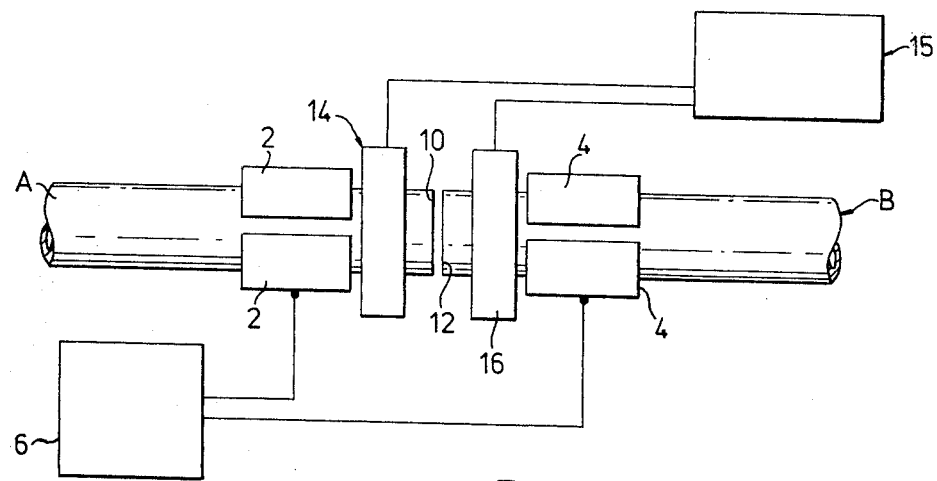
FIG. 1a illustrates the general arrangement of two tubular workpieces to be joined and apparatus for joining them in a method embodying the invention.
Figure 1B:
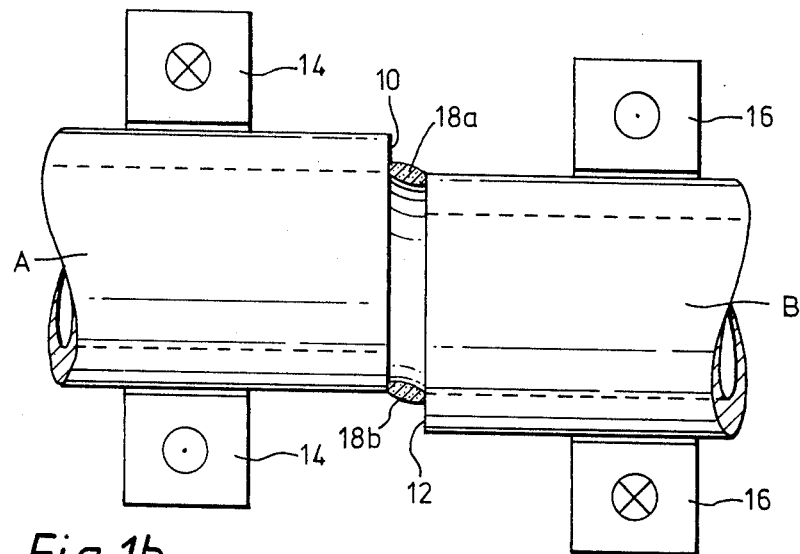
FIG. 1b shows the two tubular workpieces, with their magnetising solenoids, at an instant during an arc-heating operation.
Figure 2:
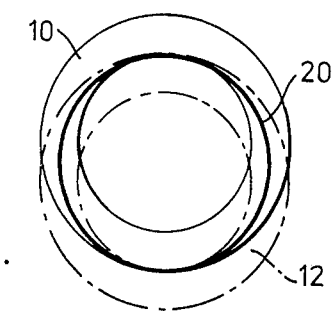
FIG. 2 illustrates the position of the arc path relative to the end faces of the two tubes for the workpiece positions shown in FIG. 1.

In FIGS. 1a, 1b and 2, two tubes A and B, are held in clamps 2 and 4 respectively. A power source 6 supplies current through the clamps 4 to the end faces 10 and 12 at which the tubes are to be joined. The tubes are given a relative orbital motion in a plane parallel to their end faces and are illustrated at a moment of maximum relative offset for the side view shown in FIG. 1b. Magnetising solenoids 14 and 16, fed from a separate power supply 15, extend around opposite tube ends and induce magnetic fields in opposite directions, producing a radial magnetic field at the end faces.

When an arc is struck between tubes A and B, the radial magnetic field causes the arc to move around the facing tubular ends of the workpieces at a very fast rate. For the tube positions shown in FIG. 1b, two positions of the arc are indicated at 18a and 18b. In FIG. 2, the whole of the arc path (shown by the thickened line 20) is indicated for the given relative positions of the face 10 of tube A, indicated by the full lines, and the face 12 of tube B, indicated by the dashed lines. It will be apparent that the maximum offset is approximately equal to the wall thickness of the tubes and that as tube B orbits with respect to tube A, the arc path traced out will be extremely complex, causing the arc to move over the whole of the two abutting surfaces.

Using 50 mm diameter mild steel tubes with a wall thickness of 7 mm, we found that the uniformity of heating over the tube ends enabled good welds to be achieved. The frequency of the orbital movement in the trials carried out was between 0.5 and 10 Hz but for this size of the tube we found that the best results were obtained when the frequency was not less than 1 Hz.

On large components, where the weld time is increased, lower frequencies may be employed, for example as low as 0.1 Hz. Additionally, it may in some cases be desirable to programme a change of frequency into the weld cycle.

Figure 3:
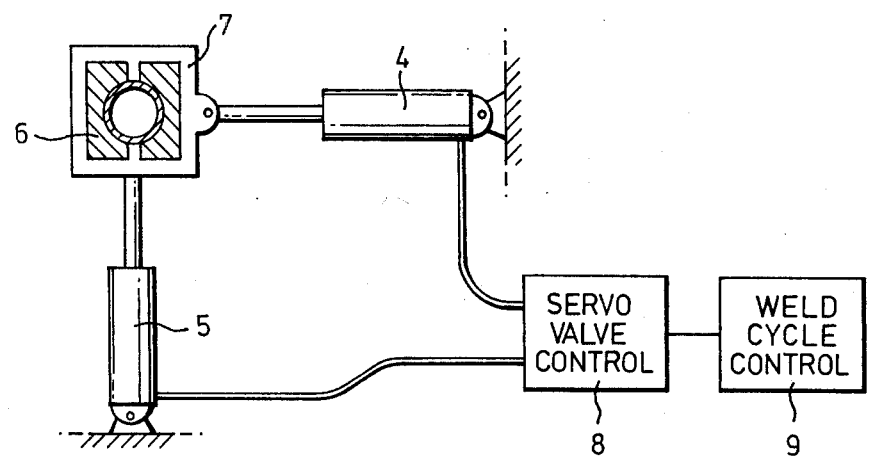
FIG. 3 illustrates apparatus for generating a relative orbital movement of the tubular workpieces.

FIG. 3 illustrates one form of apparatus for bringing about the orbital movement. In FIG. 3, two actuators 4 and 5 control the movement of clamps 6 and 7 which extend around the tube B. A servocontrol system 8, in turn governed by a weld cycle control unit 9, operates the actuators to cause each to apply to the clamps a sinewave movement, the two sinewave movements being 90° out of phase.

Although the drawings illustrate the application of the invention to circular tubes, it will be appreciated that the invention can also be applied to the arc butt welding of non-circular tubular components and also non-tubular components. Thus, for square-section tubes a square orbiting movement will be generated and a suitable orbiting movement can also be generated for oval tubes.

An example of the welding of non-tubular components utilising the invention is the butt welding of strip. For this process, the arc movement is controlled so that it runs continuously across the end of the sheet of plate during the heating period. In addition, the strip ends are given a relative vibratory movement, in a plane parallel to the plane of these ends, perpendicular to the plane of the strip.

The electrical supply for these magnetically impelled arc butt welding techniques may be AC or DC. The speed of rotation of the arc due to the magnetic field is typically 100–300 m/sec for steel.

Figure 4:
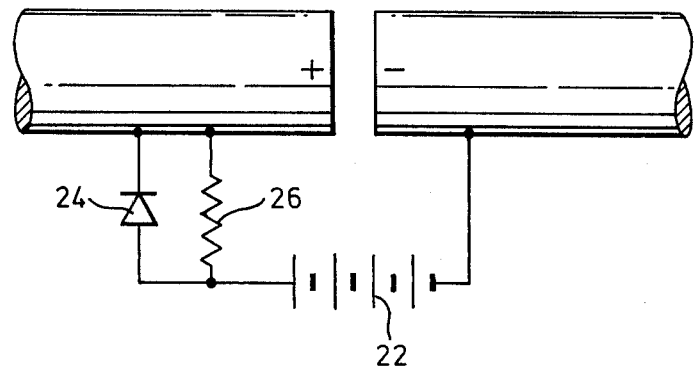
FIG. 4 illustrates the connection of a secondary power supply for disrupting short circuits.

With all magnetically impelled arc butt welding processes, globules of metal may extend across the two arcing faces, causing short circuits. Because the power source used has a drooping current-voltage characteristic, on some occasions there may be insufficient current to rupture the short circuit, so that the arcing process is halted. To overcome this, a second power source may be connected across the tube ends, the second power source having an open-circuit voltage less than that of the arc voltage between the tube ends and having a substantially flat characteristic. The secondary power source may be, for example, a battery, as shown in FIG. 4. With this arrangement, the secondary power source provides no current during the arcing periods. When a short circuit occurs, however, the voltage across the tube ends falls to a low value and a high current is drawn from the secondary power source, this current being sufficient to rupture the short circuit. Once the short circuit has been ruptured, the arc is re-established and the process continues. Thus, once the process has started, the secondary power source is switched into and out of use automatically according to the requirements.

In FIG. 4, the battery 22 is shown in series with a parallel diode 24 and resistor 26, to limit over-charging of the battery.

Figure 5:
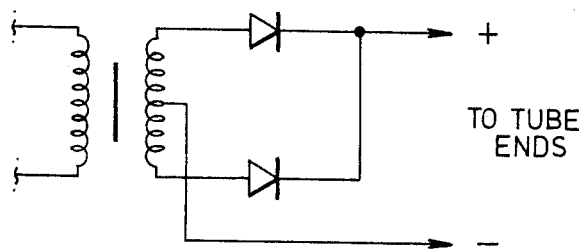
FIG. 5 illustrates an AC supply with a full wave rectifier, for use as a secondary power supply; and, FIG. 6 illustrates diagrammatically the use of a three-phase AC supply and full wave rectifier as a secondary power supply for use in a method embodying the present invention.
Figure 6:
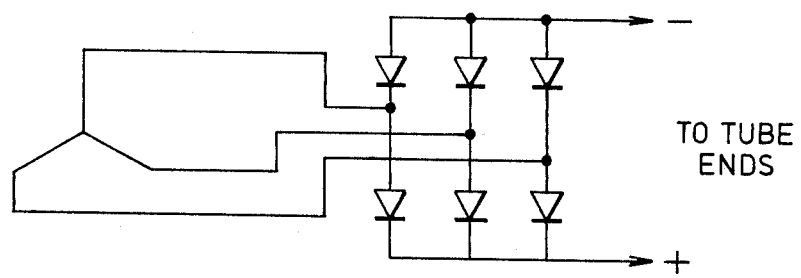

In practice, it is more convenient to use in place of the battery either a single-phase full-wave rectifier system, as shown in FIG. 5, or a three-phase full-wave rectifier system, as shown in FIG. 6.

We claim:

1. A method of joining two parts by an arc butt welding process, comprising the steps of striking an arc between the two faces to be joined, moving the arc over the faces by means of a magnetic field, relatively moving the two faces in a plane generally parallel to the faces such that the overlapping area of the two faces changes during the arc-heating period, so that the magnetic field and the relative movement constrain the arc roots to move over substantially the whole of each face, and then bringing the faces into registration and applying forging pressure across the said faces.

2. A method in accordance with claim 1, for the arc butt welding of circular tubes, in which the arc is caused to rotate in a ring by its interaction with a magnetic field and the two annular faces to be joined are given a relative orbital movement.

3. A method in accordance with claim 2, in which the frequency of the orbital movement is between 0.1 Hz and 10 Hz.

4. A method in accordance with claim 3, in which the frequency of the orbital movement is varied during the arc-heating period.

5. A method in accordance with claim 1, in which the parts joined are non-circular tubular components.

6. A method in accordance with claim 1, in which the parts joined by arc butt welding are in the form of strip material, the arc running continuously across the end of the sheet of plate during the arc-heating period and the strip ends being given a relative vibratory movement in a plane parallel to the plane of these ends.

7. A method in accordance with claim 1 or 2, in which the speed of movement of the arc due to the magnetic field is between 100 and 300 m/sec.

8. A method in accordance with claim 1 or 2, in which in addition to a drooping characteristic power supply for sustaining the arc across the parts to be joined, a second electrical supply is connected across the said parts, the second electrical supply having an open circuit voltage less than that of the arc voltage between the ends of the said parts to be joined and having a substantially flat characteristic, whereby, the additional power supply provides no current during the normal arcing period but provides a high current to rupture any short circuit between the said parts when the output of the first power supply has fallen to a low voltage as a consequence of the high current caused by the short circuit.

9. Apparatus for joining two parts by arc butt welding comprising means connecting the said parts to opposite poles of a power supply, means for forming an arc between faces of the said parts to be joined, means generating a magnetic field whereby the arc is caused to move over the said faces to be joined, and means whereby the faces are given a relative movement in a plane generally parallel to the faces such that the overlapping area of the two faces changes during the arc-heating period, the magnetic field and the relative movement constraining the arc roots to move over substantially the whole of each face, and means for bringing the said faces into registration and for applying forging pressure across the faces.

10. Apparatus in accordance with claim 9, for the arc butt welding of circular tubes, in which the said magnetic field is such as to cause the arc to rotate in a ring, by its interaction with the magnetic field, and in which the two annular tube faces to be joined are given a relative orbital movement.

11. Apparatus in accordance with claim 10, in which to give the two tube faces a relative orbital movement, two actuators operating substantially at right angles to one another, apply to one of the two tubes a sinusoidal movement, the two sinusoidal movements of the actuators being 90° out of phase.

12. Apparatus in accordance with claim 9, comprising in addition to the principal power supply having its poles connected to the two parts to be joined, a secondary power supply of lower open circuit voltage than the principal power supply and having a flat characteristic, connected across the said ends.

13. Apparatus in accordance with claim 12, in which the secondary power supply comprises a battery and a rectifier to prevent overcharging of the battery.

14. Apparatus in accordance with claim 12, in which the secondary power supply consists of an alternating voltage supply connected to the said parts through a full-wave rectifier.

* * * * *